(No Model.)
J. T. HAMMICK.
CAR COUPLING.
No. 345,501. Patented July 13, 1886.
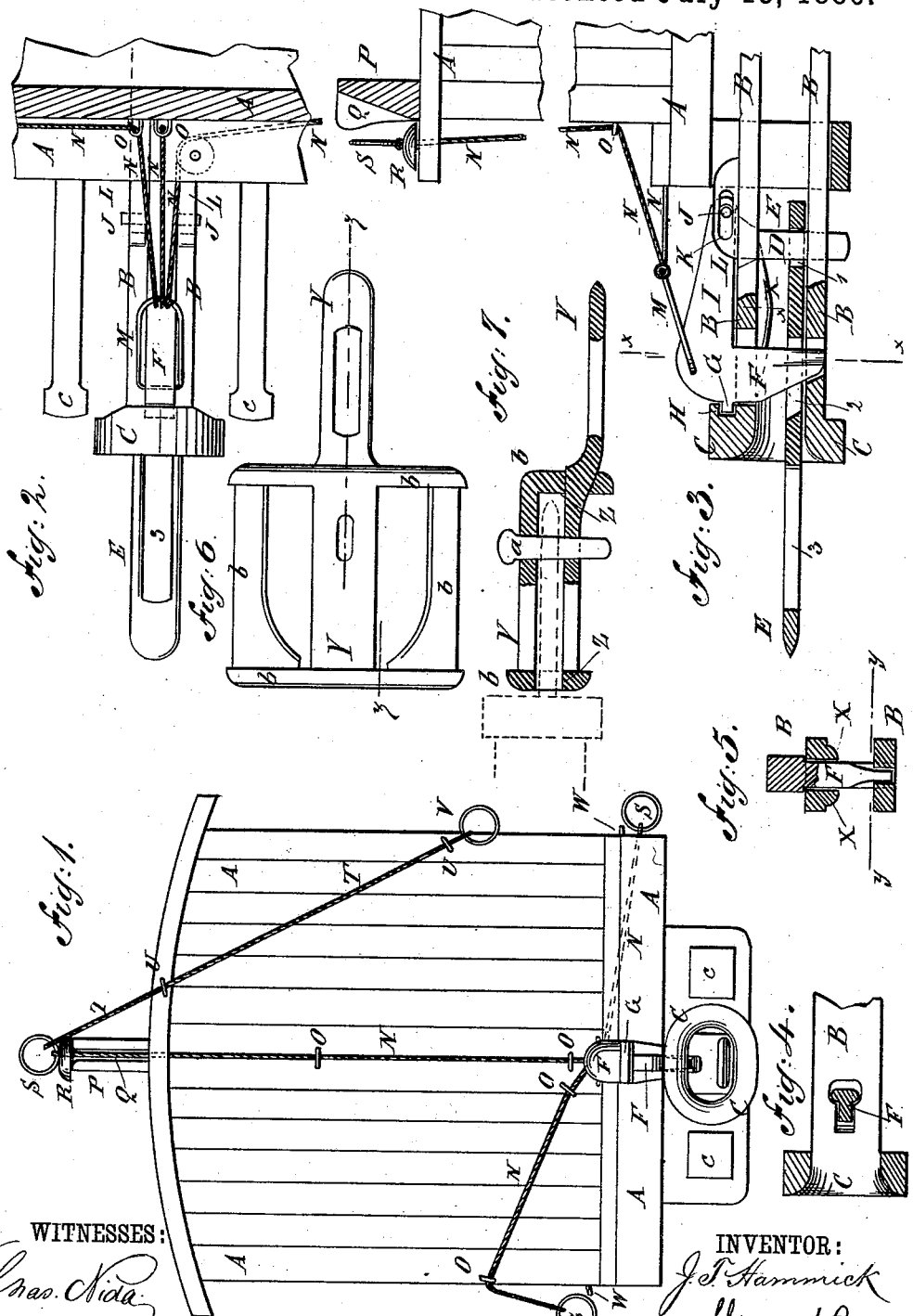
WITNESSES:
Chas. Nida
C. Sedgwick
INVENTOR:
J. T. Hammick
BY Munn & Co
ATTORNEYS.

UNITED STATES PATENT OFFICE.

JOSEPH T. HAMMICK, OF RHINEBECK, NEW YORK.

CAR-COUPLING.

SPECIFICATION forming part of Letters Patent No. 345,501, dated July 13, 1886.

Application filed February 12, 1886. Serial No. 191,766. (No model.)

*To all whom it may concern:*

Be it known that I, JOSEPH T. HAMMICK, of Rhinebeck, in the county of Dutchess and State of New York, have invented a new and useful Improvement in Automatic Car-Couplings, of which the following is a full, clear, and exact description.

Reference is to be had to the accompanying drawings, forming a part of this specification, in which similar letters of reference indicate corresponding parts in all the figures.

Figure 1 is a front elevation of a car to which my improved car-coupling has been applied. Fig. 2 is a plan view of the same, the forward part of the car being shown in section. Fig. 3 is a side elevation of the same, partly in section. Fig. 4 is a sectional plan view of the forward part of the draw-head and the adjustable pin, taken through the line $y\ y$, Fig. 5. Fig. 5 is a sectional end elevation of the same, taken through the line $x\ x\ x$, Fig. 3. Fig. 6 is a plan view of a link for connecting one of my improved couplings with an ordinary coupling on a car having its platform several inches lower. Fig. 7 is a sectional side elevation of the same, taken through the line $z\ z$, Fig. 6.

The object of this invention is to improve the construction of the car-couplings for which Letters Patent No. 321,598 were issued to me July 7, 1885, and Letters Patent, Serial No. 176,451, were allowed to me October 13, 1885, in such a manner as to make them more convenient in use and more reliable in operation.

The invention consists in the construction and combination of various parts of the car-coupling, as will be hereinafter fully described.

A represents the body of the car, with which the draw-bar B is connected in the ordinary manner. The draw-bar B is made in the form of two parallel bars, placed one above the other and connected at their forward ends by the draw-head C, which is made of oval form and with a flaring oval mouth, as shown in Figs. 1, 3, and 4.

D is the stationary coupling-pin, which passes through a hole in the draw-bar B and in the inner end of the link E. The link E is made with an opening, 1, in its rear end to receive the stationary pin D, an opening, 2, near its rear end to receive the movable coupling-pin F, and a long opening, 3, in its forward end to receive the movable pin of the adjacent car and give the coupling the necesary play. The inner end of the coupling-link E is weighted or made heavy to overbalance the outer end, and thus hold the link securely in a horizontal position when uncoupled. The movable coupling-pin F passes through a hole in the forward part of the draw-bar B and through the middle opening, 2, of the link E, and has its forward edge inclined or beveled, as shown in Fig. 3, so that the forward end of the link of an adjacent car as it enters the draw-head C will cause the said coupling-pin F to rise, which coupling-pin F, as the end of the entering link passes its lower end, drops by its own weight through the forward opening, 3, of the said link. The lower part of the movable pin F is made in T shape with rounded shoulders, and enters a similarly-shaped hole in the lower part of the draw-bar B, so that the shoulders of the pin will rest against the shoulders of the hole and sustain the draft-strain upon the lower part of the said pin. The forward side of the upper end of the movable pin F is vertical and rests against the vertical rear side of the upper part of the draw-head C, to sustain the draft-strain upon the upper end of the said pin, so that the movable pin F will be firmly supported at both ends against the draft-strain. Upon the forward side of the upper end of the movable pin F is formed a transverse rib, G, which enters a transverse groove, H, in the rear side of the upper part of the draw-head C, to prevent the said pin when in use from jumping up and thus accidentally uncoupling the cars. With this construction, when the end of an entering link strikes the inclined forward edge of the movable pin F the said pin is first pushed back, withdrawing the rib G from the groove H, and is then raised.

Upon the rear side of the upper end of the movable pin F is formed a rearwardly-projecting shank, I, which extends back along the top of the draw-bar B, and to its rear end is attached a transverse pin, J, the projecting ends of which enter and slide in slots K in lugs L, formed upon or attached to the upper side of the rear part of the draw-bar B, the said slots K being made of such a length that none of the draft-strain will come upon the pin J.

To the upper end of the movable pin F is pivoted the end of a link, M, to the other end of which are attached the ends of three cords or chains, N, which pass through guide staples or eyes O, attached to the end of the car and are led one to the top of the car and one to each side. In the case of platform-cars the top cord is not used and the side cords are led through guide-holes in the car-frame, as indicated in dotted lines in the right-hand lower part of Fig. 1.

To the top of the car-body A, at a little distance from its end edge, is attached a short standard, P, in the forward side of which is formed an inclined groove, Q, and to the end of the top cord, N, is attached a button, R, as shown in Figs. 1 and 3, to rest upon the top of the standard P when the movable pin F is raised and support the said pin in a raised position, so that the cars can be run together without coupling. The ends of the cords N are provided with rings S, for convenience in operating them.

To the ring S of the top cord, N, or to the button R are attached two cords, T, only one of which is shown in the drawings, and which are led through guide-staples U, and have rings or handles V attached to their ends, so that by pulling upon one of the cords T the button R will be drawn off the top of the standard P and the coupling-pin F allowed to drop into place.

To the sides of the car-body A are attached knobs W, to receive the rings S of the said cords N when the movable pin F is raised from the side of the car, and it is desired to secure the said pin in a raised position to allow cars to be run together without coupling. With this construction, when two cars are run together the projecting end of the link E of each car enters the draw-head C of the other car, and raises and engages with the movable pin F, so that the two cars will be coupled by two links and two pins.

Upon the lower side of the upper part of the draw-bar B are formed convexed projections X, against which the upper side of the upper link, E, rests to prevent the links from sliding up and down upon the coupling-pins, and being worn and wearing the said pins unnecessarily, while at the same time the said links are allowed to rock to accommodate themselves to the movements of the cars.

When a car provided with my improved coupling is to be coupled with a car having an ordinary coupling with a platform several inches lower, the intermediate link, Y, is used, which has a socket, Z, at one end to receive the projecting end of the link E, so that the said intermediate link, Y, can be secured to the said link E by a pin, $a$. The other end of the link Y, which enters the draw-head of the other car, has a slot formed through it to receive the ordinary coupling-pin that connects it with the said draw-head.

Upon the socket end of the link Y is formed a frame, $b$, which rests against the draw-head C, and which, when the cars are run together, comes in contact with the bumpers $c$ of the cars, and relieves the draw-bars from the jar.

Having thus fully described my invention, I claim as new and desire to secure by Letters Patent—

1. The draw-bar B, having a head, C, a vertical aperture in rear of said head, the lower part being T-shaped, and slotted lugs K on top of the bar in rear of the aperture, in combination with the shank I, having a pin, J, entering the slots in the lugs K, and a pin, F, inclined on its forward edge, straight on its rear edge, and projecting down through the aperture, the lower end of the pin being T-shaped in cross-section to conform to the lower part of the aperture, the rear vertical edge of the pin being adapted to engage the rear vertical wall of the aperture to limit the rearward movement of the pin, substantially as set forth.

2. The combination, with the draw-head and coupling-pin, of the standard P, having the inclined slot Q, the cord N, and the button R, substantially as set forth.

3. The combination, with the draw-head and the coupling-pin, of the standard P, having the inclined slot Q, the cord N, the button R, and ring S at the upper end of the cord, the cord T, connected to the ring and extended down through guides to the side of the car, and provided with a ring, V, substantially as set forth.

4. In a car-coupling, the draw-bar B, made, substantially as herein shown and described, with convexed projections X upon the lower side of its upper part, for the upper link to rest against to prevent the links from sliding up and down upon the coupling-pins, while allowing them to rock freely, as set forth.

5. In a car-coupling, the combination, with the draw-head C and the projecting end of the link E, of the intermediate link, Y, having a socket, Z, at one end to receive the said link E, and provided with a frame, $b$, at its socket end to engage with the draw-heads and the bumpers of the car, substantially as herein shown and described, whereby the said coupling-link can be connected with an ordinary draw-head on a car having a lower platform, and the draw-bars will be protected from jar, as set forth.

JOSEPH T. HAMMICK.

Witnesses:
 GEO. ESSELSTYN,
 J. C. McCARTY.